United States Patent
Yu et al.

(10) Patent No.: US 12,341,338 B1
(45) Date of Patent: Jun. 24, 2025

(54) RAPID TRACKING AND ADAPTIVE COMPENSATION METHOD FOR POWER FLUCTUATION OF PULSE LOAD OF SHIP

(71) Applicant: Shanghai JiaoTong University, Shanghai (CN)

(72) Inventors: Moduo Yu, Shanghai (CN); Wentao Huang, Shanghai (CN); Jiahao He, Shanghai (CN); Nengling Tai, Shanghai (CN); Jie Wang, Shanghai (CN)

(73) Assignee: Shanghai JiaoTong University, Shanghai (CN)

( * ) Notice: Subject to any disclaimer, the term of this patent is extended or adjusted under 35 U.S.C. 154(b) by 0 days.

(21) Appl. No.: 19/037,402

(22) Filed: Jan. 27, 2025

(30) Foreign Application Priority Data

Feb. 5, 2024 (CN) .......................... 202410162320.0

(51) Int. Cl.
   *H02J 1/02* (2006.01)
(52) U.S. Cl.
   CPC .............. *H02J 1/02* (2013.01); *H02J 2310/42* (2020.01)
(58) Field of Classification Search
   CPC ................................ H02J 1/02; H02J 2310/42
   See application file for complete search history.

(56) References Cited

U.S. PATENT DOCUMENTS

2021/0119452 A1* 4/2021 Weaver .................... H02J 7/34

OTHER PUBLICATIONS

Yacine Terriche, Abderrzak Laib, Abderezak Lashab, Chun-Lien Sun, Josep Guerrero, Juan Vasquez; A Frequency Independent Technique ToEstimate Harmonnics and Interharmonics in Shipboard Microgrids; IEEE Transactions on Smart Grid; 13 pages; 2022.*
CNIPA, Notification of Second Office Action for CN202410162320.0, Sep. 2, 2024, 8 pages.
Shanghai Jiao Tong University (Applicant), Replacement claims (allowed) of CN202410162320.0, Sep. 23, 2024, 15 pages.
CNIPA, Notification to grant patent right for invention in CN202410162320.0, Sep. 29, 2024, 3 pages.

* cited by examiner

*Primary Examiner* — Harry R Behm
(74) *Attorney, Agent, or Firm* — Hemisphere Law, PLLC; Zhigang Ma

(57) ABSTRACT

A tracking and adaptive compensation method for power fluctuation of a pulse load of a ship is provided. The method includes: based on a microgrid topology model of the ship, a pulse load model of the pulse load, and an interharmonic power and pulse parameter relationship model, performing power fluctuation tracking, frequency selection and a power spectrum analysis to obtain filtering parameters of a low-pass filter and filtering parameters of a band-pass filter; performing waveform adaptation to eliminate a phase delay caused by the low-pass filter and the band-pass filter, and obtaining a control command for a power compensation strategy; and generating, by a power loop, a pulse width modulation (PWM) signal to control a switching tube in a bidirectional direct current (DC)/DC converter of each of an energy storage battery pack and a supercapacitor of a hybrid energy storage system.

5 Claims, 6 Drawing Sheets

RAPID TRACKING AND ADAPTIVE COMPENSATION METHOD FOR POWER FLUCTUATION OF PULSE LOAD OF SHIP

CROSS-REFERENCE TO RELATED APPLICATION

This application claims priority to Chinese patent application No. CN 202410162320.0, filed to China National Intellectual Property Administration (CNIPA) on Feb. 5, 2024, which is herein incorporated by reference in its entirety.

TECHNICAL FIELD

The present disclosure relates to the technical field of power control of ships, and particularly to a rapid tracking and adaptive compensation method for power fluctuation of a pulse load of a ship.

BACKGROUND

Due to variable parameters of a pulse load, existing power fluctuation compensation technologies that use a filter with a fixed filtering time constant cannot address all operating conditions. Under some harsh conditions, the compensation and tracking effects of the existing power fluctuation compensation technologies are poorer. An existing hybrid energy storage compensation indicator is generally a harmonic current or a bus voltage. However, since power fluctuation is influenced by both current and voltage, after compensation using existing methods, larger power fluctuation may still occur, thereby posing a significant threat to a normal operation of a rotating device such as a generator. The removal of variable-frequency interharmonic is a challenging issue in power fluctuation compensation. Some studies have analyzed the influence of various parameters of the pulse load on system dynamic characteristics through extensive experimental data, but there is a lack of analysis on frequency-domain fluctuations.

Existing technologies mainly focus on the impact of the pulse load on a voltage and a frequency, lacking analysis of fluctuations of the interharmonic power. There is also a lack of theoretical derivation of the quantitative relationship between the interharmonic power of the pulse load and pulse parameters, thereby leading to an unclear mechanism of fluctuation of the interharmonic power of the pulse load and making it difficult to analyze and compensate for the fluctuation of the interharmonic power of the pulse load.

SUMMARY

Aiming at the shortage that compensation indexes of an existing hybrid energy storage system are generally a harmonic current and a bus voltage, and a power fluctuation amplitude is still larger after compensation, which affects a safe operation of a rotating device such as a generator, the present disclosure proposes a rapid tracking and adaptive compensation method for power fluctuation of a pulse load of a ship. Facing the changeable parameters of the pulse load and various working conditions, a relationship between a harmonic power of the pulse load and parameters of the pulse load is modeled, a power fluctuation range is obtained according to a modeling result, the for accurate frequency division, power spectrum analysis is called for real-time adaptive adjustment, and power loop control logic is used to achieve the effect of adaptive matching compensation.

The present disclosure is implemented through the following technical solutions.

The present disclosure provides a tracking and adaptive compensation method for power fluctuation of a pulse load of a ship, which includes: based on a microgrid topology model of the ship, a pulse load model of the pulse load, and an interharmonic power and pulse parameter relationship model, performing power fluctuation tracking, frequency selection and a power spectrum analysis to obtain filtering parameters of a low-pass filter and filtering parameters of a band-pass filter; performing waveform adaptation to eliminate a phase delay caused by the low-pass filter and the band-pass filter, and obtaining a control command for a power compensation strategy; and generating, by a power loop, a pulse width modulation (PWM) signal to control a switching tube in a bidirectional direct current (DC)/DC converter of each of an energy storage battery pack and a supercapacitor of a hybrid energy storage system.

The microgrid topology model of the ship includes: a diesel generator, multiple loads connected in parallel to a DC bus through converters, and the hybrid energy storage system including the energy storage battery pack and the supercapacitor; the diesel generator is connected to the DC bus through an alternating current (AC)/DC rectifier converter and is configured to supply power to the DC bus; each of the energy storage battery pack and the supercapacitor is connected to the DC bus through the bidirectional DC/DC converter and is controlled by the bidirectional DC/DC converter; the multiple loads include a propulsion load, the pulse load, and a daily use load; and a power consumption of the propulsion load and the pulse load accounts for a majority of a power consumption of the propulsion load, the pulse load, and the daily use load.

In an embodiment, the interharmonic power and pulse parameter relationship model refers to a relationship between three pulse parameters and an interharmonic power shock generated during operation of the pulse load, the interharmonic power and pulse parameter relationship model is obtained through formula derivation and theoretical analysis, the three pulse parameters consist of a pulse power of the pulse load, a pulse duty ratio of the pulse load and a pulse period of the pulse load, and an interharmonic oscillation component is expressed as follows:

$$\overline{p}(t) = P_L \left\{ \sum_{\substack{m=1 \\ m \neq n}}^{\infty} \left\{ \sum_{m=1}^{\infty} 3V_m \cdot k \cdot \frac{\sin(n\pi D)}{n\pi} \cdot \cos\left[\left(\omega_m - \frac{2n\pi}{T}\right)t + (\phi_m - \delta_n)\right] \right\} \right\}.$$

A peak power amplitude of an interharmonic is obtained by analysis of a harmonic power modeling formula for the pulse load, and the peak power amplitude of the interharmonic is expressed as follows:

$$P_{n\Omega_0} = \frac{3kP_L V_1}{\pi} \cdot \left\{ \sin(\pi D) \cdot \cos\left[\delta_n - \delta_1 + \frac{2(n-1)\pi(\delta_n - \phi_1)}{\omega_1 T - 2n\pi}\right] + \right.$$
$$\frac{\sin(2\pi D)}{2} \cdot \cos\left[\delta_n - \delta_2 + \frac{2(n-2)\pi(\delta_n - \phi_1)}{\omega_1 T - 2n\pi}\right] +$$
$$\frac{\sin(3\pi D)}{3} \cdot \cos\left[\delta_n - \delta_3 + \frac{2(n-3)\pi(\delta_n - \phi_1)}{\omega_1 T - 2n\pi}\right] +$$
$$\left. \frac{\sin(4\pi D)}{4} \cdot \cos\left[\delta_n - \delta_4 + \frac{2(n-4)\pi(\delta_n - \phi_1)}{\omega_1 T - 2n\pi}\right] \right\} + o(n)$$

where $P_{n\Omega_0}$ represents a spectral amplitude at a frequency of $n\Omega_0$, $\Omega_0$ represents an angular frequency of the pulse load, k represents a conversion coefficient, and n is a positive integer; a ratio of the peak power amplitude of the interharmonic to an average total power value $P_{total}$ of an integrated power system of the ship is expressed as follows:

$$\varepsilon_{n\Omega_0} = \frac{P_{n\Omega_0}}{P_{total}} * 100\% = \frac{P_{n\Omega_0}}{P_M + \overline{P}} * 100\%,$$

and the average total power value $P_{total}$ of the integrated power system of the ship is decomposed into an average power $P_M$ of a propulsion motor and an average power P of the pulse load.

In an embodiment, the performing power fluctuation tracking and frequency selection includes: predicting and calculating approximate fluctuation amplitudes and frequencies of the interharmonic power generated at the diesel generator according to an amplitude ratio of the interharmonic power at each of the frequencies, and obtaining a fluctuation frequency curve $f_n(x)=\Sigma_{n\Omega_0}-\lambda_n(x-n\Omega_0)^2$, where n is a positive integer and a value range of n is $\Sigma_{n\Omega_0} \geq f_{lim}(n\Omega_0)$, and the fluctuation frequency curve $f_n(x)$ and an amplitude limiting curve $f_{lim}(x)$ are combined to make $f_n(x)=f_{lim}(x)$, to thereby obtain spectral overrun ranges $f_{ncLow}$ and $f_{ncHigh}$; a fluctuation range redundancy is added according to a fluctuation decline rate at an intersection of the fluctuation frequency curve $f_n(x)$ and the amplitude limiting curve $f_{lim}(x)$ to the spectral overrun ranges $f_{ncLow}$ and $f_{ncHigh}$, to update the spectral overrun ranges $f_{ncLow}$ and $f_{ncHigh}$:

$$\begin{cases} f_{ncLow} = f_{ncLow} + \dfrac{K_{com}}{2\lambda_n(f_{ncLow}-n\Omega_0)} \\ f_{ncHigh} = f_{ncHigh} + \dfrac{K_{com}}{2\lambda_n(f_{ncHigh}-n\Omega_0)} \end{cases},$$

where $K_{com}$ represents a compensation coefficient; and respond and track are performed as per the spectral overrun ranges $f_{ncLow}$ and $f_{ncHigh}$ calculated according to the above formula after an interharmonic power shock of the pulse load occurs, which reduces the shock of the pulse load on the integrated power system of the ship.

In an embodiment, the performing power spectrum analysis includes: using the power spectrum analysis to monitor the power fluctuation of the pulse load in real time, correcting the filtering parameters of the low-pass filter and the band-pass filter according to results of the power spectrum analysis, and after adaptive compensation for a power change of the pulse load is realized, confirming the filtering parameters of the low-pass filter and the band-pass filter by two analysis methods: the spectral overrun ranges $f_{ncLow}$ and $f_{ncHigh}$ are obtained according to the results of the power spectrum analysis, and the filtering parameters of the low-pass filter and the band-pass filter are determined according to the results of the power spectrum analysis and results of a fluctuation range analysis.

Further, a tracking and adaptive compensation system for power fluctuation of a pulse load of a ship is provided, which includes a quantitative relationship unit between interharmonic power and pulse load parameters, a power spectrum analysis unit, a filter parameter adjustment unit, a filter delay elimination unit, and a power loop logic unit. The quantitative relationship unit between interharmonic power and pulse load parameters is configured to perform formula calculation according to the pulse power of the pulse load, the pulse duty ratio of the pulse load and the pulse period of the pulse load, to obtain fluctuation amplitudes and a frequency range of the interharmonic power; the power spectrum analysis unit is configured to perform window function processing and Fourier analysis calculation according to power information at an outlet of the diesel generator to obtain a power spectrum distribution; the filter parameter adjustment unit is configured to perform formula calculation and analysis processing according to the power spectrum distribution obtained by the quantitative relationship unit between the interharmonic power and the pulse load parameters and the power spectrum analysis unit to obtain a power frequency band to be compensated; the filtering delay elimination unit is configured to perform waveform extension and data adaptation processing according to input historical data of an FIR filter and a window size of the FIR filter, to obtain a result of phase delay elimination; and the power loop logic unit is configured to: calculate the power loop according to waveform information filtered by the FIR filter, and obtain an output signal compensated by the hybrid energy storage system.

The present disclosure has at least the following beneficial effects.

The present disclosure theoretically deduces and models the quantitative relationship between interharmonic power and pulse load parameters. Through the power spectrum analysis method, the method provides the basis for adaptive parameter adjustment and frequency division filtering parameter determination. Through the adaptive compensation method of inter-harmonic power fast tracking, the impulse load impact can be quickly responded according to the quantitative relationship of inter-harmonic power, and the filtering parameters can be adaptively adjusted in real time by power spectrum analysis, thus realizing the compensation of inter-harmonic power fluctuation. With the help of power loop control logic, compared with voltage and current loop control logic, the compensation effect of power fluctuation is improved. Compared with the prior art, the present disclosure gives consideration to fast tracking and real-time adaptive adjustment of pulse power impact, reduces the harm of power impact to the generator, and enhances the operation reliability of the generator.

DETAILED DESCRIPTION OF EMBODIMENTS

Figure 1:
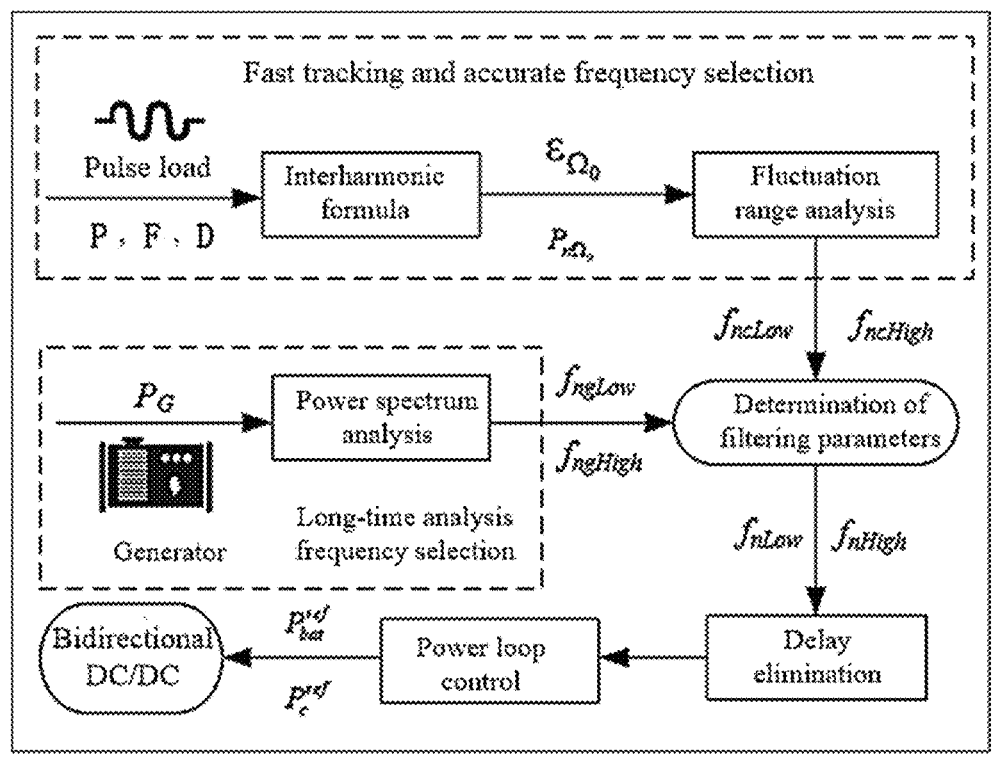
FIG. 1 illustrates a schematic flow chart of a rapid tracking and adaptive compensation method for power fluctuation of a pulse load of a ship according to an embodiment of the present disclosure.

As illustrated in FIG. 1, FIG. 1 illustrates a schematic flow chart of a rapid tracking and adaptive compensation method for power fluctuation of a pulse load of a ship according to an embodiment of the present disclosure. The rapid tracking and adaptive compensation method includes a first step, a second step, a third step, and a fourth step.

In the first step, a microgrid topology model of the ship and a pulse load model of the pulse load is constructed.

Figure 8:
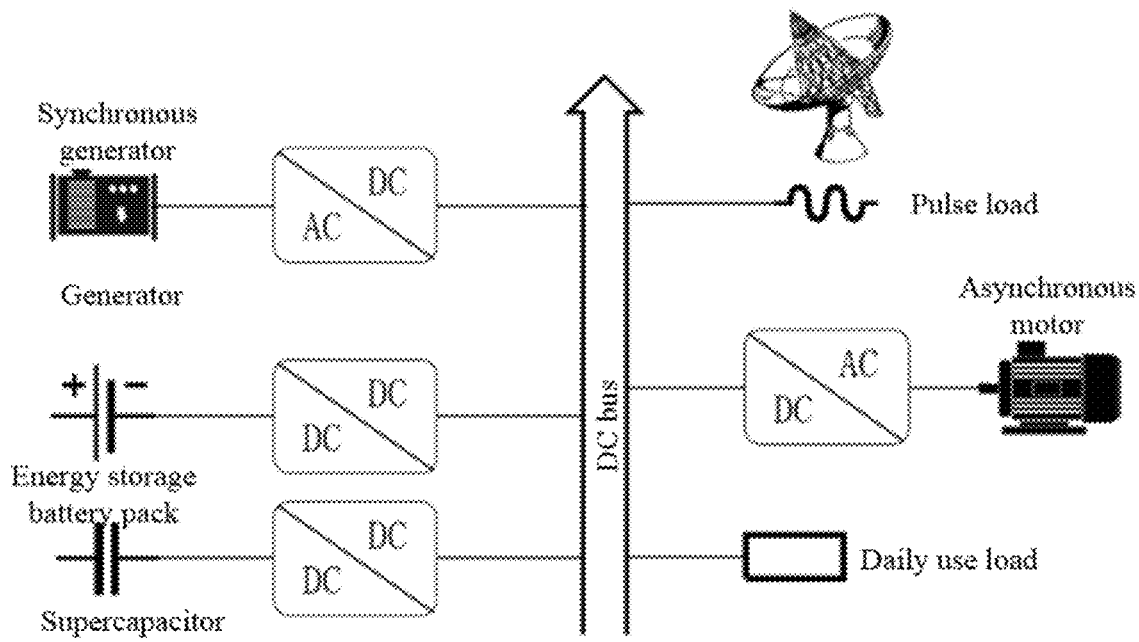
FIG. 8 illustrates a schematic diagram of a microgrid topology model of a ship.

As shown in FIG. 8, the microgrid topology model of the ship includes: a generator, multiple loads connected in parallel to a direct current (DC) bus through converters, and a hybrid energy storage system. Specifically, the generator is connected to the DC bus through an alternating current (AC)/DC rectifier converter and is configured to supply power to the DC bus. The hybrid energy storage system includes an energy storage battery pack and a supercapacitor. Each of the energy storage battery pack and the supercapacitor is connected to the DC bus through a bidirectional DC/DC converter and is controlled by the bidirectional DC/DC converter. The multiple loads include a propulsion load, a high-power pulse load, and a daily use load. A power consumption of the propulsion load and the high-power pulse load accounts for a majority of a power consumption of the propulsion load, the high-power pulse load, and the daily use load.

Figure 2:
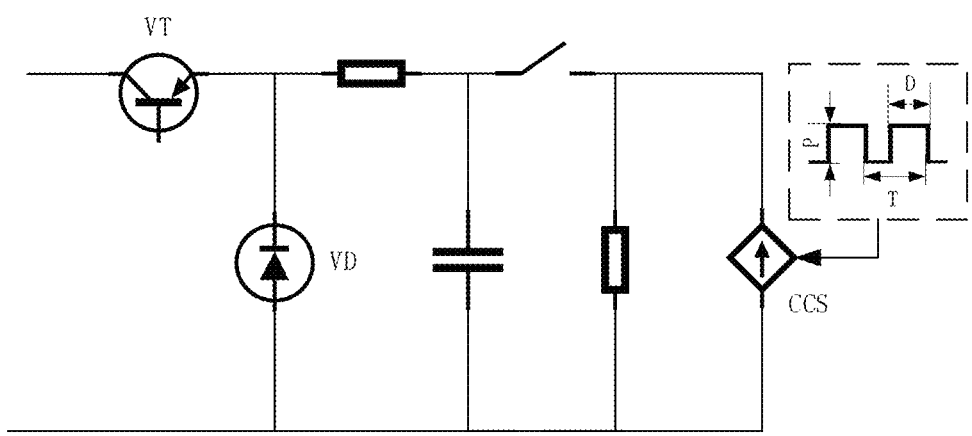
FIG. 2 illustrates a schematic diagram of a pulse load model.

As shown in FIG. 2, the pulse load model includes a controlled current source (CCS) used to equivalently replace a surge current. A control signal of the CCS is composed of a pulse square wave. A pulse period of the pulse square wave represents a change frequency of the pulse load, a pulse power of the pulse square wave represents a maximum impact amplitude of the pulse load, and a pulse duty cycle of the pulse square wave represents a duration ratio of a peak power of the pulse load.

The CCS is driven by a control signal to output the pulse load with a pulse power as a peak value. A peak output time is determined according to the period of the pulse square wave and the duty cycle of the pulse square wave, to thereby form the pulse square wave.

In the second step, an interharmonic power and pulse parameter relationship model is constructed. The second step includes performing quantitative relationship analysis between a power fluctuation amplitude and pulse parameters, performing interharmonic analysis of influence of the pulse load on the generator based on an instantaneous power theory, suppressing voltage fluctuation through an excitation and speed regulation system, and real-time sampling and analyzing a power spectrum of the generator.

In a process for performing quantitative relationship analysis between the power fluctuation amplitude and the pulse parameters, the loading of the pulse load causes an interharmonic power impact on an integrated power system of the ship, spectral analysis is performed on pulse square wave to obtain an amplitude after Fourier analysis of the pulse square wave. A formula of a spectral distribution of an interharmonic of the pulse load is expressed as follows:

$$F_n = \frac{1}{T}\int_{-\frac{T}{2}}^{\frac{T}{2}} f(t)e^{-jn\Omega t}dt = \frac{1}{T}\int_{-\frac{\tau}{2}}^{\frac{\tau}{2}} Ee^{-jn\Omega t}dt = \frac{E}{T} \cdot \left. \frac{e^{-jn\Omega t}}{-jn\Omega} \right|_{-\frac{\tau}{2}}^{\frac{\tau}{2}} =$$

$$\frac{2E}{T} \cdot \frac{\sin(n\Omega\tau/2)}{n\Omega} = \frac{E\tau}{T} \cdot \frac{\sin(n\Omega\tau/2)}{n\Omega\tau/2}$$

where n=0,±1,±2, . . . , T represents the period of the pulse square wave, τ represents output time of a pulse peak of the pulse square wave, E represents the pulse peak, and Ω represents an angular frequency. Based on a preset pulse control signal, the period, the power, and the duty cycle of the pulse load model in the first step are substituted into the formula to obtain the spectrum distribution of the interharmonic of the pulse load:

$$F_n = P_L \cdot D \cdot \frac{\sin(n\pi D)}{n\pi D} = P_L \cdot \frac{\sin(n\pi D)}{n\pi}.$$

A spectrum corresponding to the spectrum distribution of the interharmonic of the pulse load consists of multiple discrete spectral lines spaced at intervals of a fundamental frequency $2\pi/T$, which is equivalent to the pulse load generating fundamental interharmonic components and frequency multiplication interharmonics of the fundamental interharmonic components. The spectrum corresponding to the spectrum distribution of the interharmonic of the pulse load has convergence, that is, an amplitude of the interharmonics decreases with time.

A process for performing interharmonic analysis of influence of the pulse load on the generator based on the instantaneous power theory is implemented according to the following formulas:

$$\begin{cases} v_a = \sqrt{2}V\sin(\omega t + \phi) + \sum_{n=2}^{\infty}\sqrt{2}V_n\sin(\omega_n t + \phi_n) \\ v_b = \sqrt{2}V\sin\left(\omega t - \frac{2\pi}{3} + \phi\right) + \sum_{n=2}^{\infty}\sqrt{2}V_n\sin\left(\omega_n t - \frac{2\pi}{3} + \phi_n\right) \\ v_c = \sqrt{2}V\sin\left(\omega t + \frac{2\pi}{3} + \phi\right) + \sum_{n=2}^{\infty}\sqrt{2}V_n\sin\left(\omega_n t + \frac{2\pi}{3} + \phi_n\right) \end{cases}$$

$$\begin{cases} i_a = \sqrt{2}I\sin(\omega t + \delta) + \sum_{n=2}^{\infty}\sqrt{2}I_n\sin(\omega_n t + \delta_n) \\ i_b = \sqrt{2}I\sin\left(\omega t - \frac{2\pi}{3} + \delta\right) + \sum_{n=2}^{\infty}\sqrt{2}I_n\sin\left(\omega_n t - \frac{2\pi}{3} + \delta_n\right) \\ i_c = \sqrt{2}I\sin\left(\omega t + \frac{2\pi}{3} + \delta\right) + \sum_{n=2}^{\infty}\sqrt{2}I_n\sin\left(\omega_n t + \frac{2\pi}{3} + \delta_n\right) \end{cases}$$

where $V_n$ represents an effective value of a voltage of an n-times frequency pulse interharmonic, $I_n$ represents an effective value of a current of the n-times frequency pulse interharmonic, $\omega_n$ represents an angular frequency of the n-times frequency pulse interharmonic, φn represents a phase angle of the voltage of the n-times frequency pulse interharmonic, $\delta_n$ represents a phase angle of the current of the n-times frequency pulse interharmonic, $v_a$, $v_b$, and $v_c$ represent instantaneous three-phase voltages, and $i_a$, $i_b$, and $i_c$ represent instantaneous three-phase currents. The instantaneous three-phase voltages and currents are transformed by using a CLARK transformation to a two-phase coordinate system to obtain $v_\alpha$, $v_\beta$, $i_\alpha$, and $i_\beta$. In an instantaneous power theory, an instantaneous active power p and a reactive power q are obtained through a formula expressed as follows:

$$\begin{cases} p = v_\alpha i_\alpha + v_\beta i_\beta \\ q = v_\beta i_\alpha - v_\alpha i_\beta \end{cases},$$

where each of the instantaneous active power p and the reactive power q is composed of a constant average power component and an interharmonic oscillation component. A power compensation mainly focuses on the instantaneous active power, therefore, only the instantaneous active power is analyzed to obtain the constant average power component $\bar{p} = \sum_{n=1}^{\infty} 3 V_n I_n \cos(\phi_n - \delta_n)$ and the interharmonic oscillation component $$\tilde{p}(t) = \left\{ \sum_{m=1, m \neq n}^{\infty} \left\{ \sum_{n=1}^{\infty} 3 V_m I_n \cos[(\omega_m - \omega_n)t + (\phi_m - \delta_n)] \right\} \right\},$$

that is to say, when all interharmonic components in the instantaneous three-phase voltages and the instantaneous three-phase currents have a same frequency, the constant average power component $\bar{p}$ is generated, when all interharmonic components in the instantaneous three-phase voltages and the instantaneous three-phase currents have different frequencies, the interharmonic oscillation component $\tilde{p}(t)$ is generated, and the interharmonic oscillation component $\tilde{p}(t)$ is a power impact to be compensated. It can be seen that the power fluctuation of the interharmonic is a result of a joint action of an interharmonic voltage and an interharmonic current. It is not enough to simply smooth the voltage or current.

In a process for suppressing voltage fluctuation through the excitation and speed regulation system, the voltage fluctuation is much smaller than a current fluctuation. When m=1, an amplitude of the voltage fluctuation corresponding to a fundamental frequency is much greater than a multiplied frequency component (also referred to as harmonic component). For the interharmonic oscillation component $\tilde{p}(t)$, effect of superposition of a fundamental voltage component with all non-synchronous current fluctuations is considered. By substituting the influence of the parameters of the pulse load into the formula of the interharmonic oscillation component to obtain the interharmonic oscillation component:

$$\tilde{p}(t) = P_L \left\{ \sum_{m=1, m \neq n}^{\infty} \left\{ \sum_{n=1}^{\infty} 3 V_m \cdot k \cdot \frac{\sin(n\pi D)}{n\pi} \cdot \cos\left[\left(\omega_m - \frac{2n\pi}{T}\right)t + (\phi_m - \delta_n)\right] \right\} \right\}.$$

After simplified analysis of a harmonic power modeling formula for the pulse load, a peak power amplitude of the interharmonic is expressed as follows:

$$P_{n\Omega_0} = \frac{3k P_L V_1}{\pi} \cdot \left\{ \sin(\pi D) \cdot \cos\left[\delta_n - \delta_1 + \frac{2(n-1)\pi(\delta_n - \phi_1)}{\omega_1 T - 2n\pi}\right] + \frac{\sin(2\pi D)}{2} \cdot \cos\left[\delta_n - \delta_2 + \frac{2(n-2)\pi(\delta_n - \phi_1)}{\omega_1 T - 2n\pi}\right] + \right.$$

-continued $$\frac{\sin(3\pi D)}{3} \cdot \cos\left[\delta_n - \delta_3 + \frac{2(n-3)\pi(\delta_n - \phi_1)}{\omega_1 T - 2n\pi}\right] + \frac{\sin(4\pi D)}{4} \cdot \cos\left[\delta_n - \delta_4 + \frac{2(n-4)\pi(\delta_n - \phi_1)}{\omega_1 T - 2n\pi}\right] \right\} + o(n)$$

where $P_{n\Omega_0}$ represents a spectral amplitude at a frequency of $n\Omega_0$, $\Omega_0$ represents an angular frequency of the pulse load, k represents a conversion coefficient, and n is a positive integer. A ratio of the peak power amplitude of the interharmonic to an average total power value $P_{total}$ of the integrated power system of the ship is expressed as follows:

$$\varepsilon_{n\Omega_0} = \frac{P_{n\Omega_0}}{P_{total}} * 100\% = \frac{P_{n\Omega_0}}{P_M + \bar{p}} * 100\%$$

and the average total power value $P_{total}$ of the integrated power system of the ship is decomposed into an average power $P_M$ of a propulsion motor and an average power $\bar{p}$ of the pulse load.

In a process for real-time sampling and analyzing a power spectrum of the generator, a longer time window is used for measuring the average power to ensure accurate low-frequency calculation, and the longer time window is applied to compute a frequency content below 1 Hz. A result of the average power serves as a base of a normalized fluctuation amplitude for percentage calculation. Secondly, a shorter time window is used to calculate a frequency content at and above 1 Hz. The shorter time window is designed as a rolling window to ensure that transient events are not missed. Finally, a Kaiser-Bessel window is used to achieve rapid initial decay of a side lobe response.

Figure 3:
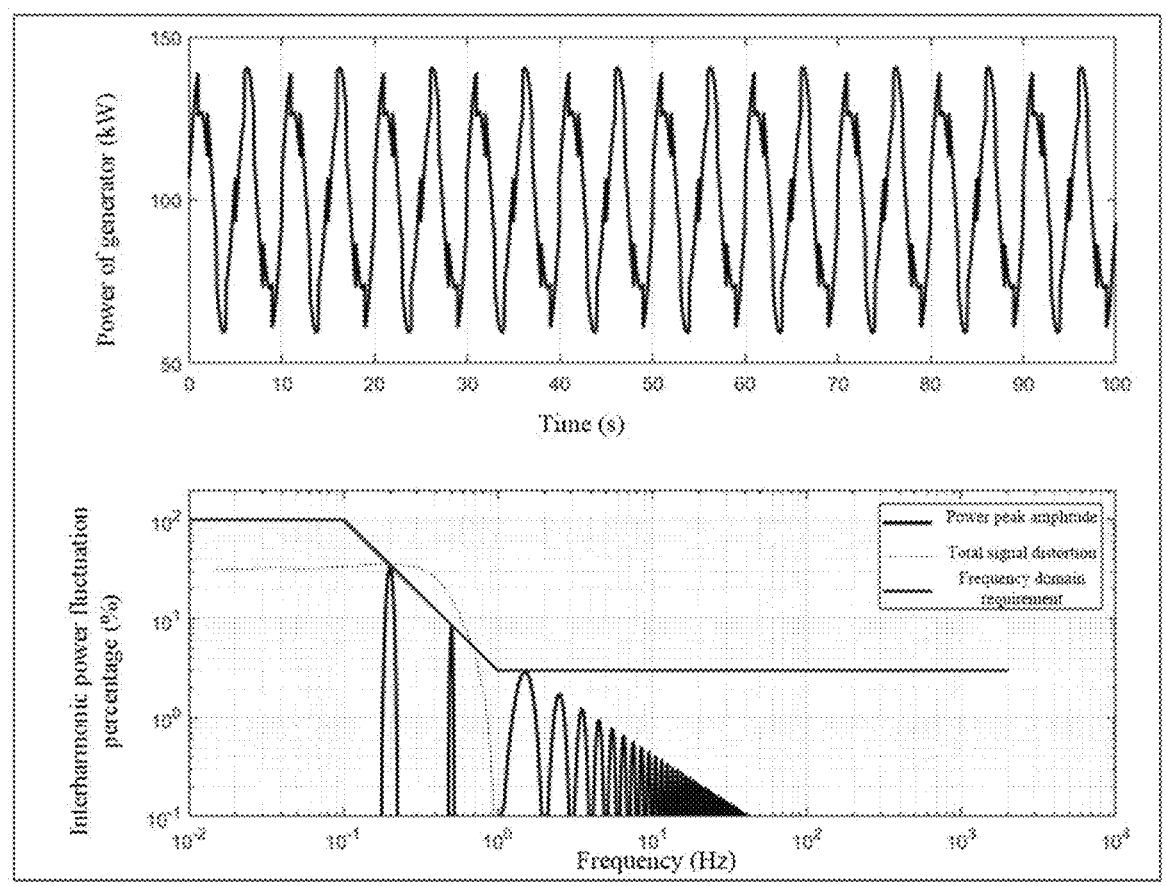
FIG. 3 illustrates a schematic diagram of power spectrum analysis.

As shown in FIG. 3, a power spectrum waveform consists of a 0.5 Hz square wave, a 0.2 Hz sine wave, and a constant power of 100 kW. An analysis results show peaks correspond to 0.2 Hz, 0.5 Hz and their harmonic multiples. Through power spectrum analysis, real-time monitoring and calculation of a power at the generator can be achieved, and compensation for excessive inter-harmonic power fluctuations can be applied based on the analysis results to ensure the stability of an electric power grid of the ship.

In the third step, fast tracking and adaptive compensation of the interharmonic power is performed. The third step includes: analyzing a fluctuation range and calculating filtering parameters; analyzing a power spectrum and determining the filtering parameters; eliminating a phase delay; using a low-pass filter in conjunction with a band-pass filter for power distribution, where a battery energy storage system is configured to compensate for low-frequency components, and the band-pass filter is configured for compensation on a supercapacitor energy storage system; and obtaining an upper frequency limit and a lower frequency limit according to a frequency division formula, and calculating a to-be-compensated power of the energy storage battery pack and a to-be-compensated power of the supercapacitor.

Figure 4:
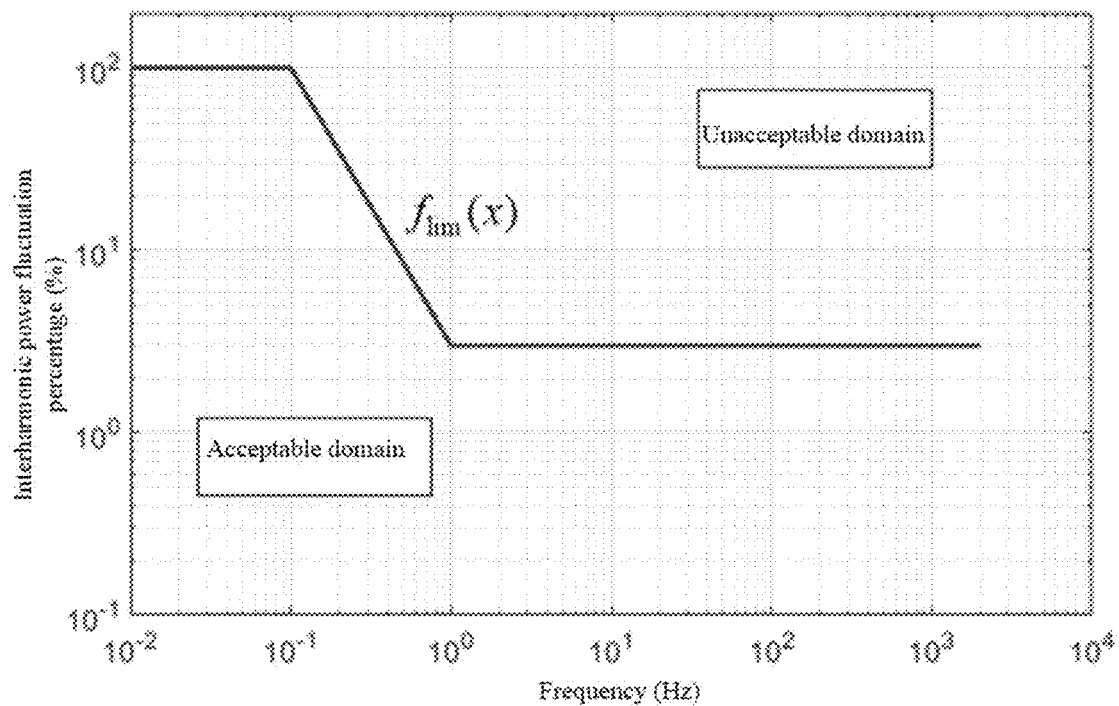
FIG. 4 illustrates a schematic diagram of a requirement of interharmonic power fluctuation.

In a process for analyzing the fluctuation range and calculating the filtering parameters, as shown in FIG. 4, the electric power grid of the ship is configured to limit an instantaneous harmonic power impact on the generator being less than an amplitude limiting curve $f_{lim}(x)$ at any single frequency from 0.01 Hz to 2 kHz. In FIG. 4, the average power is an average of a three-phase instantaneous power after Fourier analysis under a longer time window, and an interharmonic power fluctuation is defined as an amplitude ratio of an interharmonic power at each frequency, and an approximate fluctuation amplitude and a frequency of the interharmonic power generated at the generator are predicted and calculated, and thus a fluctuation frequency curve $f_n(x)=\Sigma_{n\Omega_0}-\lambda_n(x-n\Omega_0)^2$ is obtained, where n is a positive integer and a value range of n is $\Sigma_{n\Omega_0} \geq f_{lim}(n\Omega_0)$. The fluctuation frequency curve $f_n(x)$ and the amplitude limiting curve $f_{lim}(x)$ are combined to make $f_n(x)=f_{lim}(x)$, to obtain spectral overrun ranges $f_{ncLow}$ and $f_{ncHigh}$. A fluctuation range redundancy is added according to a fluctuation decline rate at an intersection of the fluctuation frequency curve $f_n(x)$ and the amplitude limiting curve $f_{lim}(x)$ to the spectral overrun ranges $f_{ncLow}$ and $f_{ncHigh}$, to update the spectral overrun ranges $f_{ncLow}$ and $f_{ncHigh}$:

$$\begin{cases} f_{ncLow} = f_{ncLow} + \dfrac{K_{com}}{2\lambda_n(f_{ncLow} - n\Omega_0)} \\ f_{ncHigh} = f_{ncHigh} + \dfrac{K_{com}}{2\lambda_n(f_{ncHigh} - n\Omega_0)} \end{cases},$$

where $K_{com}$ represents a compensation coefficient.

Figure 5:
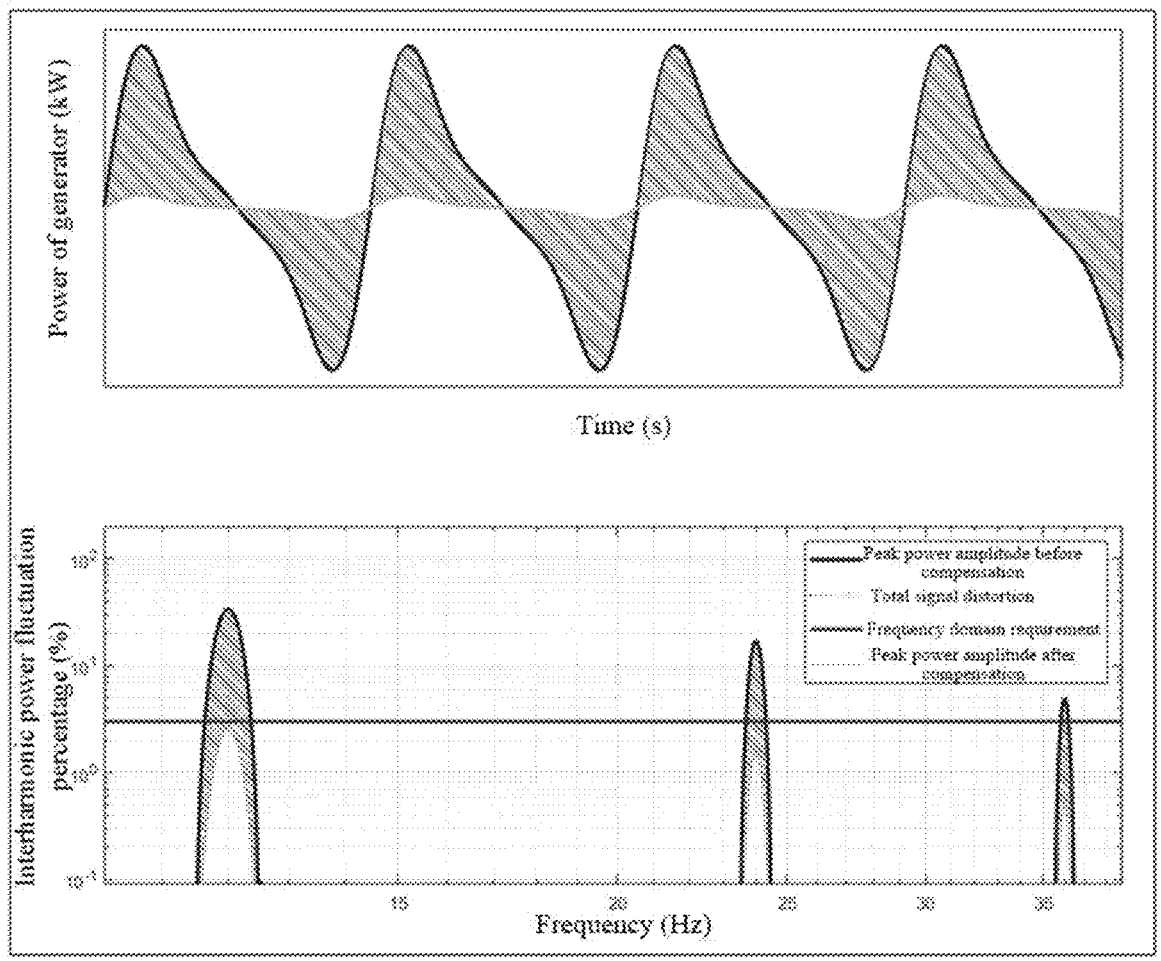
FIG. 5 illustrates a schematic diagram of frequency band compensation.

As shown in FIG. 5, blue lines represent time-domain and frequency-domain curves before power compensation and green lines represent time-domain and frequency-domain curves after power compensation, and a black diagonal part represents a time-domain fluctuation change area corresponding to frequency-domain compensation. It can be clearly seen that the power fluctuation amplitude is greatly reduced after selectable frequency compensation is performed according to calculation results. Because this embodiment avoids the defect that the power spectrum analysis needs a certain time to sample, the claimed method can respond and track immediately as per the spectral overrun ranges $f_{ncLow}$ and $f_{ncHigh}$ calculated according to the above formula after the interharmonic power shock of the pulse load occurs, which greatly reduces the shock of the pulse load on the integrated power system of the ship.

In a process for analyzing the power spectrum and determining the filtering parameters, power spectrum analysis is used to monitor the power fluctuation of the pulse load in real time, and filtering parameters of the low-pass filter and the band-pass filter are corrected according to results of the power spectrum analysis, and after adaptive compensation for a power change of the pulse load is realized, the filtering parameters of the low-pass filter and the band-pass filter are confirmed by two analysis methods: the spectral overrun ranges $f_{ncLow}$ and $f_{ncHigh}$ are obtained according to the results of the power spectrum analysis, and the filtering parameters of the low-pass filter and the band-pass filter are determined according to the results of the power spectrum analysis and results of a fluctuation range analysis:

$$\begin{cases} f_{nLow} = (\alpha f_{ncLow} + \beta f_{ngLow}) * K_{low} \\ f_{nHigh} = (\alpha f_{ncHigh} + \beta f_{ngHigh}) * K_{high} \end{cases},$$

where $\alpha$ and $\beta$ are weight coefficients, respectively, $K_{low}$ and $K_{high}$ are reliability coefficients, which are configured to improve the reliability of the fluctuation range analysis. Therefore, a power compensation allocation strategy of the hybrid energy storage system is adjusted to achieve the purpose of following and compensating the power fluctuation of the pulse load.

Figure 6:
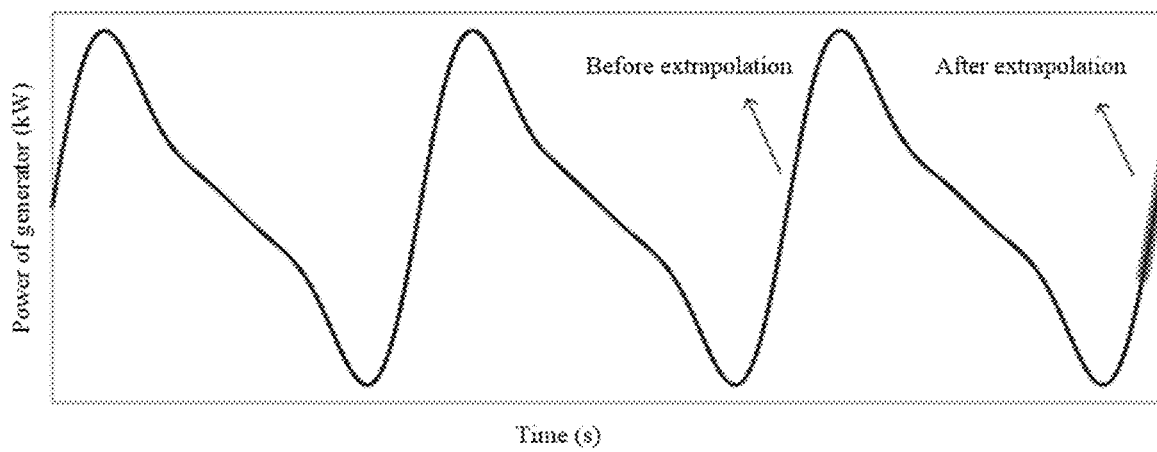
FIG. 6 illustrates a schematic diagram of filtering data extrapolation.

In a process for eliminating a phase delay, as shown in FIG. 6, tail data of a filtered waveform is matched with previous data, a matching degree of a tail waveform is calculated based on a formula as follows:

$$\rho = \sum_{m=1}^{N} \sqrt{\dfrac{[x(m) - y(m)]^2}{N}},$$

and N/2 data points with a highest matching degree are selected for continuation to eliminate the phase delay caused by a finite impulse response (FIR) filter, where x(m) represents original data, and y(m) represents filtering historical data.

In a process for using the low-pass filter in conjunction with the band-pass filter for power distribution, compensation is performed as per formulas as follows:

$$\Delta P = P_{Load} - P_G, \begin{cases} H_{Ln}(s) = \dfrac{K\omega_{cn}}{s + \omega_{cn}} \\ H_{Bn}(s) = \dfrac{\xi_n K\omega_{0n}s}{s^2 + \xi_n\omega_{0n}s + \omega_{0n}^2} \end{cases}, \begin{cases} \xi_n = \dfrac{f_{nHigh} - f_{nLow}}{f_{nLow} + f_{nHigh}} \\ \omega_{cn} = 2\pi f_{nLow} \\ \omega_{0n} = \pi(f_{nLow} + f_{nHigh}) \end{cases},$$

where $P_{Load}$ represents a power of the pulse load, $P_G$ represents a power of the generator, $H_{Ln}(s)$ represents a low-pass transfer function, $H_{Bn}(s)$ represents a band-pass transfer function, K represents a filter gain, which is set to be 1, $x_n$ represents a damping coefficient, $\omega_{cn}$ represents a low-pass cut-off frequency, $\omega_{0n}$ represents a band-pass center frequency, and n represents n-times frequency for the pulse load. The compensated power components respectively distributed to the energy storage battery pack and the supercapacitor respectively filtering are obtained as follows: after $$\begin{cases} P_{bat}^{ref} = \sum_{n=1}^{\infty} \dfrac{K\omega_{cn}}{s + \omega_{cn}} \Delta P \\ P_c^{ref} = \sum_{n=1}^{\infty} \dfrac{\xi_n K\omega_{0n}s}{s^2 + \xi_n\omega_{0n}s + \omega_{0n}^2} \Delta P \end{cases},$$

where $P_{bat}^{ref}$ and $p_c^{ref}$ represent compensated power components respectively distributed to the energy storage battery pack and the supercapacitor respectively after filtering.

Then, the upper frequency limit $f_{nLow}$ and the lower frequency limit $f_{nHigh}$ are obtained according to a frequency division formula, and a to-be-compensated power of the energy storage battery pack and a to-be-compensated power of the supercapacitor are calculated.

Figure 7:
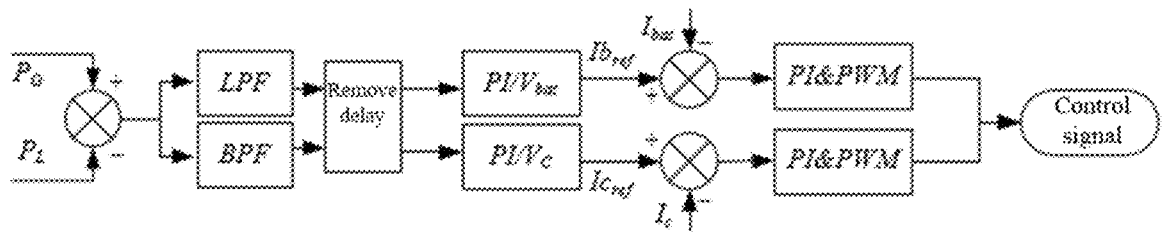
FIG. 7 illustrates a schematic diagram of a power loop control logic.

In the fourth step, as shown in FIG. 7, the bidirectional DC/DC converter receives a control command of the power compensation strategy to change a current direction, and realizes a charge and discharge control of the hybrid energy storage system and a bidirectional flow of energy of the hybrid energy storage system. The fourth step further includes the following steps.

Firstly, a harmonic power to be compensated is obtained through the low-pass filter, the harmonic power to be compensated is divided by a battery voltage value $V_{bat}$ to obtain a first result, and proportional integral (PI) and amplitude limiting are performed on the first result to obtain a reference compensation current value $I_{bref}$.

Secondly, the supercapacitor obtains a compensation power through the band-pass filter, the compensation power is divided by a voltage value Vc of the supercapacitor to obtain a second result, and PI and amplitude limiting are performed on the second result to obtain a reference current value $I_{cref}$.

Thirdly, the reference compensation current value $I_{bref}$ is compared with a first actual battery output current $I_{bat}$ to obtain a first difference value, the reference current value $I_{cref}$ is compared with a second actual battery output current $I_c$ to obtain a second difference value, PI and amplitude limiting are performed on the first and second different values to obtain a process result, a PWM signal is generated by a modulator based on the process result, to control a switching tube in the bidirectional DC/DC converter of each of the energy storage battery pack and the supercapacitor, so as to realize fast tracking, timely analysis of power overrun and adaptive compensation of power fluctuation.

After specific practical experiments, a real time laboratory (RT-LAB) simulation platform is used to model a system and simulate working conditions. Specific parameters are shown in Table 1. A control objective of the hybrid energy storage system is to compensate the power fluctuation at the generator, and parameters of a diesel generator affect an overall output power. Parameters of the pulse load and a propulsion motor affect a load side power, which leads to interharmonic power shock at the generator. Parameters of the hybrid energy storage system affect the ability of the energy storage battery pack and the supercapacitor to compensate the power fluctuation. The pulse load generates power shock, and the hybrid energy storage system adjusts the output in real time to compensate the power fluctuation according to the inter-harmonic power quickly tracks and adaptively compensates the power fluctuation according to the interharmonic power.

TABLE 1

Simulation parameters of an integrated power system of a ship

| Component | Parameter | Value |
| --- | --- | --- |
| Diesel generator | Rated voltage | 690 V |
|  | Rated power | 2000 kW |
|  | Rated frequency | 50 Hz |
| Pulse load | Pulse period | 10-60 ms |
|  | Pulse power | 60-420 kW |
|  | Pulse duty cycle | 10%~90% |
| Propulsion motor | Rated voltage | 690 V |
|  | Rated power | 1000 kW |
|  | Rated frequency | 50 Hz |
| Energy storage battery pack | Rated voltage | 1200 V |
|  | Rated capacity | 500 Ah |
|  | Initial state of charge | 80% |
| Supercapacitor | Rated voltage | 1200 V |
|  | Rated capacity | 1000 F |
|  | Initial state of charge | 80% |

An amplitude limiting curve is expressed as $f_{lim}(x)=3f^{(log_{10}(3)-2)}$, a compensation coefficient $K_{com}$ is 0.5%, weight coefficients $\alpha$ and $\beta$ are 0.5 by default, and reliability coefficients $K_{low}$ and $K_{high}$ are 95% and 105%, respectively. In order to verify the effectiveness of the fast tracking and adaptive compensation of the interharmonic power, three parameters of the pulse load are adjusted and simulated for many times. A pulse power is adjusted from 60 kW to 420 kW, a pulse period TS is adjusted from 10 vms to 60 vms, and a pulse duty ratio is adjusted from 10% to 90%. Final power fluctuation results at a side of the generator meet the fluctuation requirements of the interharmonic power, that is to say, the fluctuation amplitude is kept below the amplitude limiting curve $f_{lim}(x)$.

Figure 9:
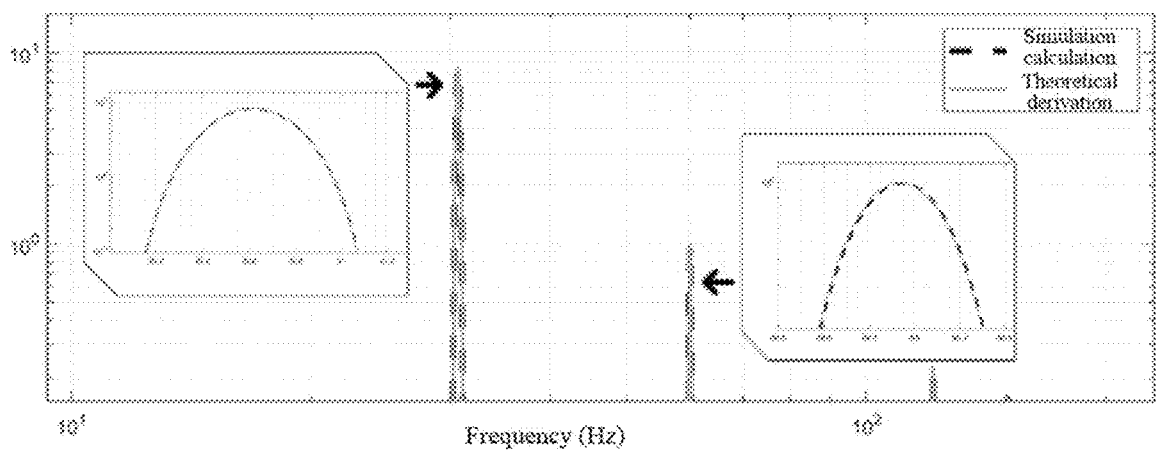
FIG. 9 illustrates a schematic comparison diagram of a theory result and a simulation result of an interharmonic power.

In order to prove the reliability of the formula of the interharmonic power and modeling of the pulse load, the pulse power is set to be 360 kW, the pulse period is set to be 30 ms, and the pulse duty ratio is set to be 50%. Calculated results are obtained by substituting the three parameters into the formula and the calculated results are compared with simulation power spectrum analysis results, as shown in FIG. 9.

Each solid curve represents a theoretical derivation result, and each dashed curve represents a simulation power spectrum analysis result. Because the curves are very close, the comparison at a fundamental frequency of the interharmonic and a double frequency of the interharmonic is considered to be enlarged. It can be seen that change trends of them are the same, and an error of a power fluctuation amplitude is very small, which strongly proves the accuracy of the quantitative relationship between the fluctuation amplitude of the interharmonic power and the parameters of the pulse load, that is, the modeling and simulation results of the interharmonic power of the pulse loads are consistent.

TABLE 2

Interharmonic fluctuation of 360 kW pulse load

| | D/% | | | | |
| --- | --- | --- | --- | --- | --- |
| $f_n$/Hz | 10 | 30 | 50 | 70 | 90 |
| 100 | 0.04% | 0.11% | 0.13% | 0.09% | 0.03% |
| 50 | 0.06% | 0.18% | 0.20% | 0.14% | 0.05% |
| 33.33 | 2.55% | 7.43% | 8.20% | 5.91% | 2.05% |
| 25 | 4.97% | 14.47% | 16.00% | 11.51% | 3.97% |
| 20 | 6.67% | 19.45% | 21.50% | 15.46% | 5.36% |

TABLE 3

Peak ratio of Interharmonic fluctuation of 240 kW pulse load

| | D/% | | | | |
| --- | --- | --- | --- | --- | --- |
| $f_n$/Hz | 10 | 30 | 50 | 70 | 90 |
| 100 | 0.03% | 0.08% | 0.10% | 0.07% | 0.02% |
| 50 | 0.05% | 0.12% | 0.14% | 0.11% | 0.03% |
| 33.33 | 2.09% | 5.49% | 6.17% | 4.69% | 1.37% |
| 25 | 4.11% | 10.75% | 12.12% | 9.06% | 2.62% |
| 20 | 5.35% | 14.24% | 16.06% | 12.01% | 3.53% |

In order to verify the accuracy of the quantitative relationship between the fluctuation amplitude of the interharmonic power and the parameters of the pulse load under various working conditions, for the three main parameters of the pulse load, the pulse power is controlled to be in a range from 240 kW to 360 kW, the pulse period is controlled to be in a range from 10 ms to 50 ms, and the pulse duty ratio is controlled to be in a range from 10% to 90%. The results are shown in Table 2 and Table 3. Comparing numerical values and change trends, the simulation results in the Table 2 and Table 3 are closely related to the theoretical derivation, which shows that all kinds of pulse loads meet the quantitative relationship between the fluctuation amplitude of the interharmonic power and the pulse parameters, and verifies the rationality of the fast tracking and adaptive compensation of the interharmonic power.

In a severe case of a large pulse load, the pulse period is 30 ms, the pulse power is 360 kW, and the pulse duty ratio is 50%, so as to illustrate the compensation effect of the fast tracking and adaptive compensation of the interharmonic power on the interharmonic power fluctuation loaded by the large pulse load.

Figure 10:
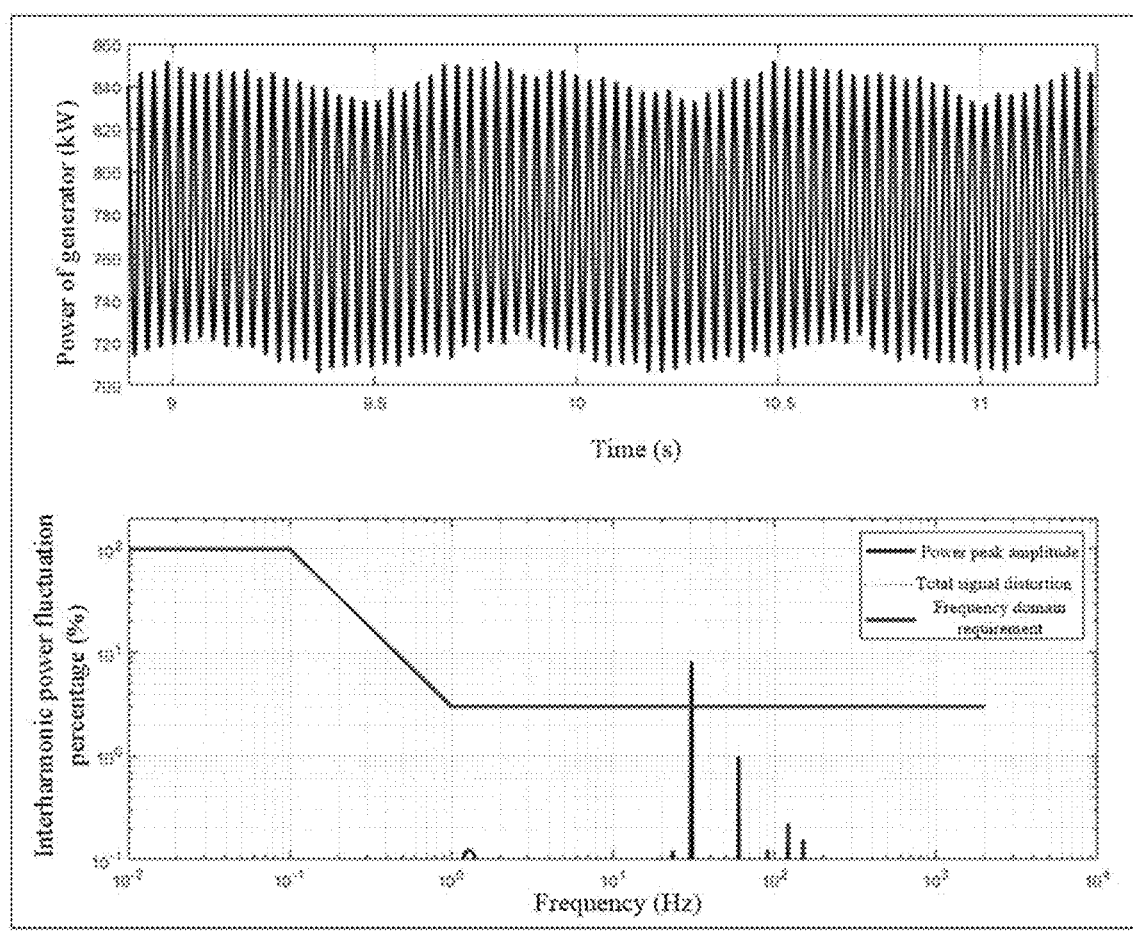
FIG. 10 illustrates a schematic diagram without the influence of an energy storage pulse.

If the hybrid energy storage system is not installed, the pulse load will have a larger interharmonic power impact on the generator, and a corresponding waveform within 20 seconds is shown in an upper part of FIG. 10. A power spectrum analysis of a power fluctuation is carried out according to the second step, and the lower part of FIG. 10 is a result of the power spectrum analysis. It can be seen that an overall range of the power fluctuation is about 700 kW to 860 kW, and a broken line is a limiting curve. The fluctuation range at about 33 Hz is more than 8%, far exceeding the standard 3%, and there is also great fluctuation at a double frequency, which threatens the reliable operation of the generator.

Figure 11:
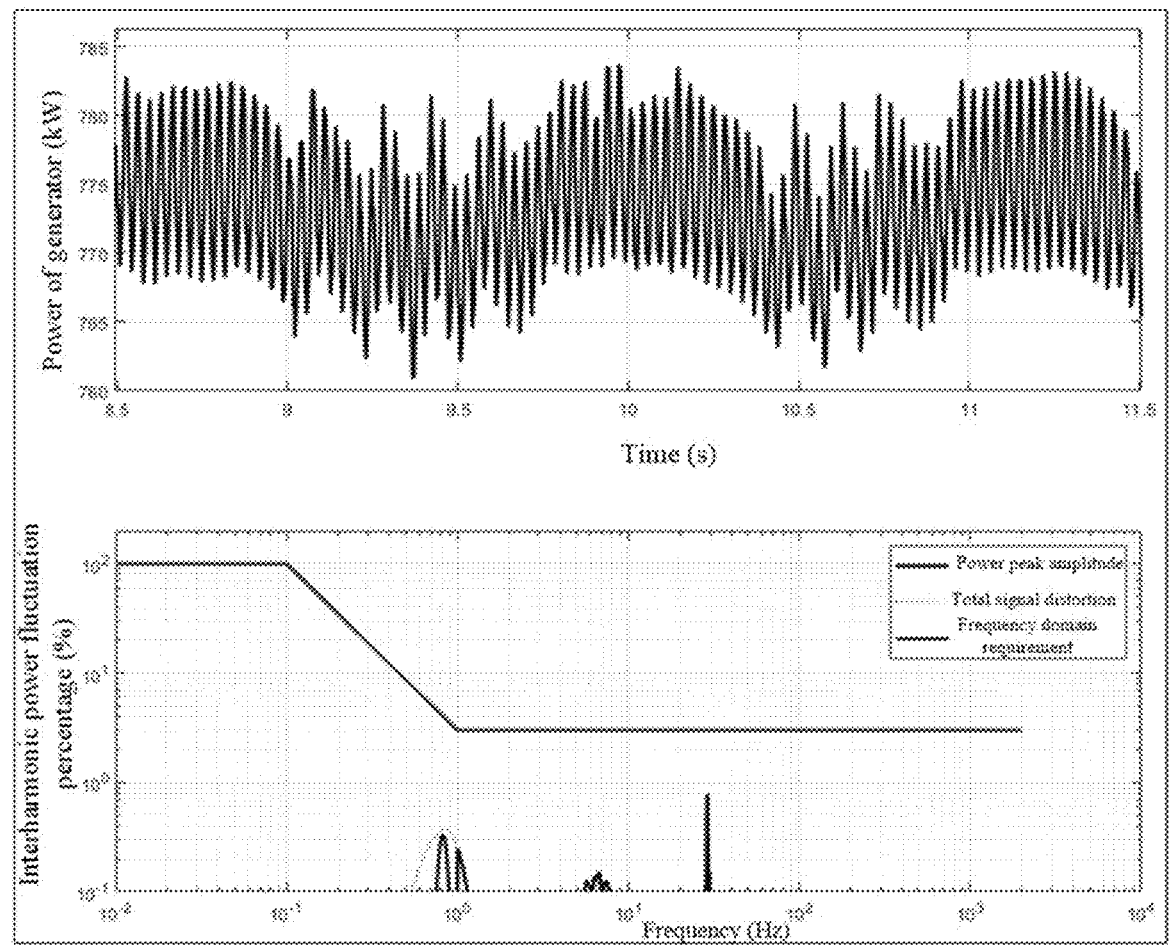
FIG. 11 illustrates a schematic diagram showing the effect of pulse loading with an energy storage.

In contrast, in the present disclosure, the hybrid energy storage system is used to compensate the fluctuation caused by the pulse load, and a corresponding waveform within 20 seconds is shown in an upper part of FIG. 11, and a power spectrum analysis of a power fluctuation is carried out, and a lower part of FIG. 11 is a result of the power spectrum analysis. It can be seen that after compensation by the hybrid energy storage system, the power fluctuation is controlled around 775 KW, and the fluctuation amplitude is much smaller than that before compensation. The result of the power spectrum analysis shows that the fluctuation at 33 Hz, which was far beyond an original limit, has been well suppressed, and a fluctuation at a double frequency and above has also been compensated to less than 0.1%. The fast tracking and adaptive compensation of the interharmonic power is effective.

This embodiment compares the fast tracking and adaptive compensation of the interharmonic power with a commonly used voltage-current loop power compensation strategy. The voltage-current loop power compensation strategy is mainly based on a voltage-current double closed-loop control logic, which mainly plays the role of compensating voltage fluctuation of an integrated power system of a ship and reducing voltage harmonic distortion rate.

TABLE 4

Comparison of voltage loop and power loop

| Control Strategy | Power fluctuation range/kW | Voltage fluctuation range/V |
|---|---|---|
| Voltage Loop | 750-850 | 1100-1165 |
| Power Loop | 760-785 | 1090-1170 |

Figure 12:
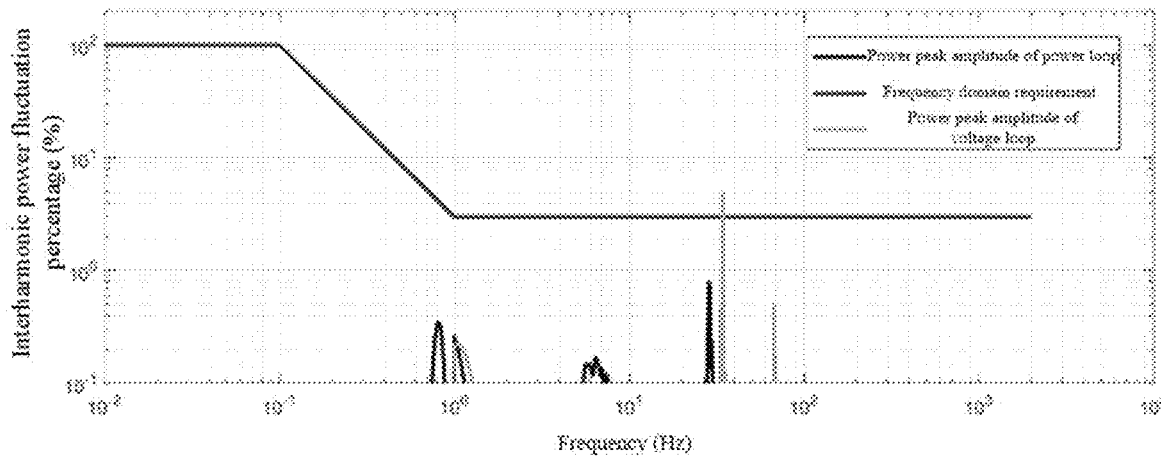
FIG. 12 illustrates a schematic diagram of analysis and comparison of a power spectrum.

The results in Table 4 and FIG. 12 can be obtained through simulation, which are the comparison of power fluctuation and voltage fluctuation under two control strategies and the results of power spectrum analysis of the two control strategies, in which a light curve is the result of compensating power fluctuation by using a voltage-current double closed-loop control strategy, and it can be noted that although the power fluctuation has been improved to some extent compared with that before compensation, there is still an over-limit situation at about 33 Hz. A heavy curve adopts a power-current double closed-loop control strategy. Compared with the former, it can clearly see the advantages of the fast tracking and adaptive compensation of the interharmonic power in power compensation, which can well reduce the impact of the interharmonic power caused by the pulse load. The data in Table 4 also strongly illustrates this point.

On the compensation effect of the power fluctuation, the power loop only fluctuates about 25 kW, while the voltage loop oscillates about 100 kW. Of course, in the aspect of voltage control, the voltage loop can control the fluctuation within 65 V, while the voltage fluctuation range of the power loop is not as small as the former, but it can still be controlled around 80 V, which greatly improves the effect of power compensation at the expense of a slight increase in the voltage fluctuation.

In summary, the present disclosure establishes a quantitative relationship model between the interharmonic power of the pulse load and the parameters of the pulse load, and amplitude-frequency characteristics of the interharmonic power of the pulse load are obtained according to the parameters of the pulse load, which significantly improves a response speed to power shock of the pulse load and provides a reliable frequency division basis for the power compensation method. The present disclosure provides a power spectrum analysis method and a power loop control logic, considers the adaptive adjustment of filtering parameters and a compensation target of a power fluctuation amplitude, and effectively reduces power fluctuation through data acquisition and real-time analysis. The present disclosure provide a fast tracking and adaptive compensation method of an interharmonic power, which includes that following steps: obtain an amplitude-frequency characteristic function of the interharmonic power according to a quantitative relationship of the interharmonic power, obtaining a fluctuation spectrum range of the interharmonic power according to the amplitude-frequency characteristic function, determining filtering parameters by combining the fluctuation spectrum range with power spectrum analysis, and outputting a control signal after phase delay processing, so as to realize the optimal coordination of hybrid energy storage, adaptively compensate the interharmonic power fluctuation and enhance an operation reliability of the generator. In addition, the proposed method can not only compensate the interharmonic power fluctuation of the pulse load, but also respond and compensate the other power fluctuations in real time.

The above specific embodiments can be partially adjusted by those skilled in the art in different ways without departing from the principle and purpose of the present disclosure. The scope of protection of the present disclosure is subject to the claims and is not limited by the above specific embodiments, and all embodiments within its scope are bound by the present disclosure.

What is claimed is:

1. A tracking and adaptive compensation method for power fluctuation of a pulse load of a ship, the tracking and adaptive compensation method comprising:
   based on a microgrid topology model of the ship, a pulse load model of the pulse load, and an interharmonic power and pulse parameter relationship model, performing power fluctuation tracking, frequency selection and a power spectrum analysis to obtain filtering parameters of a low-pass filter and filtering parameters of a band-pass filter;
   performing waveform adaptation to eliminate a phase delay caused by the low-pass filter and the band-pass filter, and obtaining a control command for a power compensation strategy; and
   generating, by a power loop, a pulse width modulation (PWM) signal to control a switching tube in a bidirectional direct current (DC)/DC converter of each of an energy storage battery pack and a supercapacitor of a hybrid energy storage system;

wherein the microgrid topology model of the ship comprises: a diesel generator, multiple loads connected in parallel to a DC bus through converters, and the hybrid energy storage system comprising the energy storage battery pack and the supercapacitor; the diesel generator is connected to the DC bus through an alternating current (AC)/DC rectifier converter and is configured to supply power to the DC bus; each of the energy storage battery pack and the supercapacitor is connected to the DC bus through the bidirectional DC/DC converter and is controlled by the bidirectional DC/DC converter; the multiple loads comprise a propulsion load, the pulse load, and a daily use load; and a power consumption of the propulsion load and the pulse load accounts for a majority of a power consumption of the propulsion load, the pulse load, and the daily use load;

wherein the pulse load model comprises a controlled current source (CCS) used to equivalently replace a surge current, a control signal of the CCS is composed of a pulse square wave, a pulse period of the pulse square wave represents a change frequency of the pulse load, a pulse power of the pulse square wave represents a maximum impact amplitude of the pulse load, and a pulse duty cycle of the pulse square wave represents a duration ratio of a peak power of the pulse load;

wherein the interharmonic power and pulse parameter relationship model refers to a relationship between three pulse parameters and an interharmonic power shock generated during operation of the pulse load, the interharmonic power and pulse parameter relationship model is obtained through formula derivation and theoretical analysis, the three pulse parameters consist of a pulse power of the pulse load, a pulse duty ratio of the pulse load and a pulse period of the pulse load, and an interharmonic oscillation component is expressed as follows:

$$\overline{p}(t) = P_L \left\{ \sum_{\substack{m=1 \\ m \neq n}}^{\infty} \left\{ \sum_{n=1}^{\infty} 3V_m \cdot k \cdot \frac{\sin(n\pi D)}{n\pi} \cdot \cos\left[\left(\omega_m - \frac{2n\pi}{T}\right)t + (\phi_m - \delta_n)\right] \right\} \right\};$$

wherein a peak power amplitude of an interharmonic is obtained by analysis of a harmonic power modeling formula for the pulse load, and the peak power amplitude of the interharmonic is expressed as follows:

$$P_{n\Omega_0} = \frac{3kP_L V_1}{\pi} \cdot \left\{ \sin(\pi D) \cdot \cos\left[\delta_n - \delta_1 + \frac{2(n-1)\pi(\delta_n - \phi_1)}{\omega_1 T - 2n\pi}\right] + \frac{\sin(2\pi D)}{2} \cdot \cos\left[\delta_n - \delta_2 + \frac{2(n-2)\pi(\delta_n - \phi_1)}{\omega_1 T - 2n\pi}\right] + \frac{\sin(3\pi D)}{3} \cdot \cos\left[\delta_n - \delta_3 + \frac{2(n-3)\pi(\delta_n - \phi_1)}{\omega_1 T - 2n\pi}\right] + \frac{\sin(4\pi D)}{4} \cdot \cos\left[\delta_n - \delta_4 + \frac{2(n-4)\pi(\delta_n - \phi_1)}{\omega_1 T - 2n\pi}\right] \right\} + o(n)$$

where $P_{n\Omega_0}$ represents a spectral amplitude at a frequency of $n\Omega_0$, $\Omega_0$ represents an angular frequency of the pulse load, k represents a conversion coefficient, and n is a positive integer;

wherein a ratio of the peak power amplitude of the interharmonic to an average total power value $P_{total}$ of an integrated power system of the ship is expressed as follows:

$$\varepsilon_{n\Omega_0} = \frac{P_{n\Omega_0}}{P_{total}} * 100\% = \frac{P_{n\Omega_0}}{P_M + \overline{p}} * 100\%,$$

and the average total power value $P_{total}$ of the integrated power system of the ship is decomposed into an average power $P_M$ of a propulsion motor and an average power $\overline{p}$ of the pulse load;

wherein the performing power fluctuation tracking and frequency selection comprises:
predicting and calculating approximate fluctuation amplitudes and frequencies of the interharmonic power generated at the diesel generator according to an amplitude ratio of the interharmonic power at each of the frequencies, and obtaining a fluctuation frequency curve $f_n(x) = \varepsilon_{n\Omega_0} - \lambda_n(x - n\Omega_0)^2$, where n is a positive integer and a value range of n is $\varepsilon_{n\Omega_0} \geq f_{lim}(n\Omega_0)$, and the fluctuation frequency curve $f_n(x)$ and an amplitude limiting curve $f_{lim}(x)$ are combined to make $f_n(x) = f_{lim}(x)$, to thereby obtain spectral overrun ranges $f_{ncLow}$ and $f_{ncHigh}$;

wherein a fluctuation range redundancy is added according to a fluctuation decline rate at an intersection of the fluctuation frequency curve $f_n(x)$ and the amplitude limiting curve $f_{lim}(x)$ to the spectral overrun ranges $f_{ncLow}$ and $f_{ncHigh}$, to update the spectral overrun ranges $f_{ncLow}$ and $f_{ncHigh}$:

$$\begin{cases} f_{ncLow} = f_{ncLow} + \dfrac{K_{com}}{2\lambda_n(f_{ncLow} - n\Omega_0)} \\ f_{ncHigh} = f_{ncHigh} + \dfrac{K_{com}}{2\lambda_n(f_{ncHigh} - n\Omega_0)} \end{cases},$$

where $K_{com}$ represents a compensation coefficient;

wherein respond and track are performed as per the spectral overrun ranges $f_{ncLow}$ and $f_{ncHigh}$ calculated according to the above formula after an interharmonic power shock of the pulse load occurs, which reduces the shock of the pulse load on the integrated power system of the ship; and wherein the performing power spectrum analysis comprises: using the power spectrum analysis to monitor the power fluctuation of the pulse load in real time, correcting the filtering parameters of the low-pass filter and the band-pass filter according to results of the power spectrum analysis, and after adaptive compensation for a power change of the pulse load is realized, confirming the filtering parameters of the low-pass filter and the band-pass filter by two analysis methods: the spectral overrun ranges $f_{ncLow}$ and $f_{ncHigh}$ are obtained according to the results of the power spectrum analysis, and the filtering parameters of the low-pass filter and the band-pass filter are determined according to the results of the power spectrum analysis and results of a fluctuation range analysis.

2. The tracking and adaptive compensation method for the power fluctuation of the pulse load of the ship as claimed in claim 1, comprising:
constructing the microgrid topology model of the ship and the pulse load model of the pulse load; and
constructing the interharmonic power and pulse parameter relationship model, comprising:
performing quantitative relationship analysis between the power fluctuation amplitude and the three pulse parameters, wherein loading of the pulse load causes an interharmonic power impact on the integrated power system of the ship, spectral analysis is performed on pulse square wave to obtain an amplitude after Fourier analysis of the pulse square wave, and a formula of a spectral distribution of the interharmonic of the pulse load is expressed as follows:

$$F_n = \frac{1}{T}\int_{-\frac{T}{2}}^{\frac{T}{2}} f(t)e^{-jn\Omega t}dt = \frac{1}{T}\int_{-\frac{\tau}{2}}^{\frac{\tau}{2}} Ee^{-jn\Omega t}dt = \frac{E}{T}\cdot\frac{e^{-jn\Omega t}}{-jn\Omega}\bigg|_{-\frac{\tau}{2}}^{\frac{\tau}{2}} =$$

$$\frac{2E}{T}\cdot\frac{\sin(n\Omega\tau/2)}{n\Omega} = \frac{E\tau}{T}\cdot\frac{\sin(n\Omega\tau/2)}{n\Omega\tau/2}$$

where n=0,±1,±2, ..., T represents the period of the pulse square wave, τ represents output time of a pulse peak of the pulse square wave, E represents the pulse peak, and Ω represents an angular frequency, wherein based on a preset pulse control signal, the pulse period, the pulse power, and the pulse duty cycle of the pulse load model are substituted into the formula to obtain the spectrum distribution of the interharmonic of the pulse load:

$$F_n = P_L \cdot D \cdot \frac{\sin(n\pi D)}{n\pi D} = P_L \cdot \frac{\sin(n\pi D)}{n\pi};$$

performing interharmonic analysis of influence of the pulse load on the diesel generator based on an instantaneous power theory according to the following formulas:

$$\begin{cases} v_a = \sqrt{2}V\sin(\omega t + \phi) + \sum_{n=2}^{\infty}\sqrt{2}V_n\sin(\omega_n t + \phi_n) \\ v_b = \sqrt{2}V\sin\left(\omega t - \frac{2\pi}{3} + \phi\right) + \sum_{n=2}^{\infty}\sqrt{2}V_n\sin\left(\omega_n t - \frac{2\pi}{3} + \phi_n\right) \\ v_c = \sqrt{2}V\sin\left(\omega t + \frac{2\pi}{3} + \phi\right) + \sum_{n=2}^{\infty}\sqrt{2}V_n\sin\left(\omega_n t + \frac{2\pi}{3} + \phi_n\right) \end{cases}$$

$$\begin{cases} i_a = \sqrt{2}I\sin(\omega t + \delta) + \sum_{n=2}^{\infty}\sqrt{2}I_n\sin(\omega_n t + \delta_n) \\ i_b = \sqrt{2}I\sin\left(\omega t - \frac{2\pi}{3} + \delta\right) + \sum_{n=2}^{\infty}\sqrt{2}I_n\sin\left(\omega_n t - \frac{2\pi}{3} + \delta_n\right) \\ i_c = \sqrt{2}I\sin\left(\omega t + \frac{2\pi}{3} + \delta\right) + \sum_{n=2}^{\infty}\sqrt{2}I_n\sin\left(\omega_n t + \frac{2\pi}{3} + \delta_n\right) \end{cases}$$

where $V_n$ represents an effective value of a voltage of an n-times frequency pulse interharmonic, $I_n$ represents an effective value of a current of the n-times frequency pulse interharmonic, $\omega_n$ represents an angular frequency of the n-times frequency pulse interharmonic, $\phi_n$ represents a phase angle of the voltage of the n-times frequency pulse interharmonic, and $\delta_n$ represents a phase angle of the current of the n-times frequency pulse interharmonic; wherein instantaneous three-phase voltages and currents are transformed by using a CLARK transformation to a two-phase coordinate system to obtain $v_\alpha$, $v_\beta$, $i_\alpha$, and $i_\beta$; in an instantaneous power theory, an instantaneous active power p and a reactive power q are obtained through a formula expressed as follows:

$$\begin{cases} p = v_\alpha i_\alpha + v_\beta i_\beta \\ q = v_\beta i_\alpha - v_\alpha i_\beta \end{cases},$$

where each of the instantaneous active power p and the reactive power q is composed of a constant average power component and an interharmonic oscillation component; a power compensation focuses on the instantaneous active power, therefore, only the instantaneous active power is analyzed to obtain the constant average power component $\bar{p}=\Sigma_{n=1}^{\infty}3V_nI_n\cos(\phi_n-\delta_n)$ and the interharmonic oscillation component $$\tilde{p}(t) = \left\{\sum_{\substack{m=1 \\ m\neq n}}^{\infty}\left\{\sum_{n=1}^{\infty}3V_mI_n\cos[(\omega_m-\omega_n)t+(\phi_m-\delta_n)]\right\}\right\},$$

that is to say, when all interharmonic components in instantaneous three-phase voltages and instantaneous three-phase currents have a same frequency, the constant average power component $\bar{p}$ is generated, when all interharmonic components in the instantaneous three-phase voltages and the instantaneous three-phase currents have different frequencies, the interharmonic oscillation component $\tilde{p}(t)$ is generated, and the interharmonic oscillation component $\tilde{p}(t)$ is a power impact to be compensated;

suppressing voltage fluctuation through an excitation and speed regulation system, the voltage fluctuation is much smaller than a current fluctuation, wherein when m=1, an amplitude of the voltage fluctuation corresponding to a fundamental frequency is much greater than a multiplied frequency component; for the interharmonic oscillation component $\tilde{p}(t)$, effect of superposition of a fundamental voltage component with all non-synchronous current fluctuations is considered; and the influence of the three pulse parameters of the pulse load is substituted into the formula of the interharmonic oscillation component to obtain the interharmonic oscillation component:

$$\tilde{p}(t) = P_L\left\{\sum_{\substack{m=1 \\ m\neq n}}^{\infty}\left\{\sum_{n=1}^{\infty}3V_m\cdot k\cdot\frac{\sin(n\pi D)}{n\pi}\cdot\cos\left[\left(\omega_m-\frac{2n\pi}{T}\right)t+(\phi_m-\delta_n)\right]\right\}\right\},$$

and analysis of the harmonic power modeling formula for the pulse load is performed;

real-time sampling and analyzing a power spectrum of the diesel generator, wherein a longer time window is used for measuring the average power to ensure accurate low-frequency calculation, and the longer time window is applied to compute a frequency content below 1 Hz; a result of the average power serves as a base of a normalized fluctuation amplitude for percentage calculation; a shorter time window is used to calculate a frequency content at and above 1 Hz; the shorter time window is designed as a rolling window to ensure that transient events are not missed; and a Kaiser-Bessel window is used to achieve rapid initial decay of a side lobe response;

performing tracking and adaptive compensation of the interharmonic power; and receiving, by the bidirectional DC/DC converter, a control command of the power compensation strategy to change a current direction, and realizing a charge and discharge control of the hybrid energy storage system and a bidirectional flow of energy of the hybrid energy storage system.

3. The tracking and adaptive compensation method for the power fluctuation of the pulse load of the ship as claimed in claim 2, wherein the performing tracking and adaptive compensation of the interharmonic power comprises:

analyzing a fluctuation range and calculating the filtering parameters, wherein an electric power grid of the ship is configured to limit an instantaneous harmonic power impact on the diesel generator being less than an amplitude limiting curve $f_{lim}(x)$ at any single frequency from 0.01 Hz to 2 kHz; the average power is an average of a three-phase instantaneous power after Fourier analysis under the longer time window; an interharmonic power fluctuation is defined as an amplitude ratio of an interharmonic power at each frequency; the approximate fluctuation amplitudes and the frequencies of the interharmonic power generated at the diesel generator are predicted and calculated, and the fluctuation frequency curve $f_n(x) = \Sigma_{n\Omega_0} - \lambda_n(x - n\Omega_0)^2$ is obtained, where n is a positive integer and the value range of n is $\Sigma_{n\Omega_0} \geq f_{lim}(n\Omega_0)$; the fluctuation frequency curve $f_n(x)$ and the amplitude limiting curve $f_{lim}(x)$ are combined to make $f_n(x) = f_{lim}(x)$, to obtain the spectral overrun ranges $f_{ncLow}$ and $f_{ncHigh}$, and the fluctuation range redundancy is added according to the fluctuation decline rate at the intersection of the fluctuation frequency curve $f_n(x)$ and the amplitude limiting curve $f_{lim}(x)$ to the spectral overrun ranges $f_{ncLow}$ and $f_{ncHigh}$, to update the spectral overrun ranges $f_{ncLow}$ and $f_{ncHigh}$:

$$\begin{cases} f_{ncLow} = f_{ncLow} + \dfrac{K_{com}}{2\lambda_n(f_{ncLow} - n\Omega_0)} \\ f_{ncHigh} = f_{ncHigh} + \dfrac{K_{com}}{2\lambda_n(f_{ncHigh} - n\Omega_0)} \end{cases},$$

where $K_{com}$ represents the compensation coefficient analyzing the power spectrum and determining the filtering parameters, wherein the power spectrum analysis is used to monitor the power fluctuation of the pulse load in real time, and the filtering parameters of the low-pass filter and the band-pass filter are corrected according to the results of the power spectrum analysis, and after adaptive compensation for a power change of the pulse load is realized, the filtering parameters of the low-pass filter and the band-pass filter are confirmed by the two analysis methods: the spectral overrun ranges $f_{ncLow}$ and $f_{ncHigh}$ are obtained according to the results of the power spectrum analysis, and the filtering parameters of the low-pass filter and the band-pass filter are determined according to the results of the power spectrum analysis and results of a fluctuation range analysis:

$$\begin{cases} f_{nLow} = (\alpha f_{ncLow} + \beta f_{ngLow}) * K_{low} \\ f_{nHigh} = (\alpha f_{ncHigh} + \beta f_{ngHigh}) * K_{high} \end{cases},$$

where $\alpha$ and $\beta$ are weight coefficients, $K_{low}$ and $K_{high}$ are reliability coefficients, which are configured to improve the reliability of the fluctuation range analysis; and a power compensation allocation strategy of the hybrid energy storage system is adjusted to achieve the purpose of following and compensating the power fluctuation of the pulse load;

eliminating a phase delay, wherein tail data of a filtered waveform is matched with previous data, a matching degree of a tail waveform is calculated based on a formula as follows:

$$\rho = \sum_{m=1}^{N} \sqrt{\dfrac{[x(m) - y(m)]^2}{N}},$$

and N/2 data points with a highest matching degree are selected for continuation to eliminate the phase delay caused by a finite impulse response (FIR) filter, where x(m) represents original data, and y(m) represents filtering historical data;

using the low-pass filter in conjunction with the band-pass filter for power distribution, where a battery energy storage system is configured to compensate for low-frequency components, and the band-pass filter is configured for compensation on a supercapacitor energy storage system, compensation is performed as per formulas as follows:

$$\Delta P = P_{Load} - P_G, \begin{cases} H_{Ln}(s) = \dfrac{K\omega_{cn}}{s + \omega_{cn}} \\ H_{Bn}(s) = \dfrac{\xi_n K \omega_{0n} s}{s^2 + \xi_n \omega_{0n} s + \omega_{0n}^2} \end{cases},$$

$$\begin{cases} \xi_n = \dfrac{f_{nHigh} - f_{nLow}}{f_{nLow} + f_{nHigh}} \\ \omega_{cn} = 2\pi f_{nLow} \\ \omega_{0n} = \pi(f_{nLow} + f_{nHigh}) \end{cases}$$

where $P_{Load}$ represents a power of the pulse load, $P_G$ represents a power of the generator, $H_{Ln}(s)$ represents a low-pass transfer function, $H_{Bn}(s)$ represents a band-pass transfer function, K represents a filter gain, which is set to be 1, $x_n$ represents a damping coefficient, $\omega_{cn}$ represents a low-pass cut-off frequency, $\omega_{0n}$ represents a band-pass center frequency, and n represents n-times frequency for the pulse load; the compensated power components respectively distributed to the energy storage battery pack and the supercapacitor respectively after filtering are obtained as follows:

$$\begin{cases} P_{bat}^{ref} = \sum_{n=1}^{\infty} \dfrac{K\omega_{cn}}{s + \omega_{cn}} \Delta P \\ P_c^{ref} = \sum_{n=1}^{\infty} \dfrac{\xi_n K \omega_{0n} s}{s^2 + \xi_n \omega_{0n} s + \omega_{0n}^2} \Delta P \end{cases},$$

where $P_{bat}^{ref}$ and $p_c^{ref}$ represent compensated power components respectively distributed to the energy storage battery pack and the supercapacitor respectively after filtering; and obtaining an upper frequency limit and a lower frequency limit according to a frequency division formula, and calculating a to-be-compensated power of the energy storage battery pack and a to-be-compensated power of the supercapacitor.

4. The tracking and adaptive compensation method for the power fluctuation of the pulse load of the ship as claimed in claim 2, the receiving, by the bidirectional DC/DC converter, a control command of the power compensation strategy to change a current direction, and realizing a charge and discharge control of the hybrid energy storage system and a bidirectional flow of energy of the hybrid energy storage system comprises:

obtaining a harmonic power to be compensated through the low-pass filter, dividing the harmonic power to be compensated by a battery voltage value $V_{bat}$ to obtain a first result, and performing proportional integral (PI) and amplitude limiting on the first result to obtain a reference compensation current value $I_{bref}$;

obtaining, by the supercapacitor, a compensation power through the band-pass filter, dividing the compensation power by a voltage value Vc of the supercapacitor to obtain a second result, and performing PI and amplitude limiting on the second result to obtain a reference current value $I_{cref}$; and comparing the reference compensation current value $I_{bref}$ with a first actual battery output current $I_{bat}$ to obtain a first difference value, comparing the reference current value $I_{cref}$ with a second actual battery output current Ic to obtain a second difference value, performing PI and amplitude limiting on the first and second different values to obtain a process result, generating, by a modulator, the PWM signal based on the process result, to control the switching tube in the bidirectional DC/DC converter of each of the energy storage battery pack and the supercapacitor, so as to realize tracking, timely analysis of power overrun and adaptive compensation of power fluctuation.

5. A tracking and adaptive compensation system for power fluctuation of a pulse load of a ship, configured to implement the tracking and adaptive compensation method as claimed in claim 1, wherein the tracking and adaptive compensation system comprises: a quantitative relationship unit between interharmonic power and pulse load parameters, a power spectrum analysis unit, a filter parameter adjustment unit, a filter delay elimination unit, and a power loop logic unit;

wherein the quantitative relationship unit between interharmonic power and pulse load parameters is configured to perform formula calculation according to the pulse power of the pulse load, the pulse duty ratio of the pulse load and the pulse period of the pulse load, to obtain fluctuation amplitudes and a frequency range of the interharmonic power;

wherein the power spectrum analysis unit is configured to perform window function processing and Fourier analysis calculation according to power information at an outlet of the diesel generator to obtain a power spectrum distribution;

wherein the filter parameter adjustment unit is configured to perform formula calculation and analysis processing according to the power spectrum distribution obtained by the quantitative relationship unit between the interharmonic power and the pulse load parameters and the power spectrum analysis unit to obtain a power frequency band to be compensated;

wherein the filtering delay elimination unit is configured to perform waveform extension and data adaptation processing according to input historical data of an FIR filter and a window size of the FIR filter, to obtain a result of phase delay elimination; and wherein the power loop logic unit is configured to: calculate the power loop according to waveform information filtered by the FIR filter, and obtain an output signal compensated by the hybrid energy storage system.

* * * * *